(12) United States Patent
Kim et al.

(10) Patent No.: US 6,583,836 B2
(45) Date of Patent: Jun. 24, 2003

(54) MULTI-DOMAIN LIQUID CRYSTAL DISPLAY DEVICE HAVING A DIELECTRIC STRUCTURE CONTROLLING ALIGNMENT OF THE LIQUID CRYSTAL MOLECULES

(75) Inventors: Keong Jin Kim, Kyonggi-do (KR); Do Hee Kwon, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 173 days.

(21) Appl. No.: 09/749,450

(22) Filed: Dec. 28, 2000

(65) Prior Publication Data
US 2001/0019388 A1 Sep. 6, 2001

(30) Foreign Application Priority Data
Dec. 28, 1999 (KR) .............................................. 99-63987

(51) Int. Cl.[7] ..................... G02F 1/1337; G02F 1/1333; G02F 1/1343; G02F 1/1339
(52) U.S. Cl. ....................... 349/129; 349/110; 349/123; 349/141; 349/156
(58) Field of Search .................... 349/129, 130, 349/123, 124, 141, 110, 111, 156

(56) References Cited

U.S. PATENT DOCUMENTS

| | | | | |
|---|---|---|---|---|
| 6,256,080 B1 | * | 7/2001 | Colgan et al. | 349/110 |
| 6,313,899 B1 | * | 11/2001 | Wu et al. | 349/129 |
| 6,342,939 B1 | * | 1/2002 | Hirata et al. | 349/143 |
| 6,356,335 B1 | * | 3/2002 | Kim et al. | 349/129 |
| 2001/0043301 A1 | * | 11/2001 | Liu | 349/129 |
| 2002/0015126 A1 | * | 2/2002 | Tsuda et al. | 349/129 |

* cited by examiner

*Primary Examiner*—Tarifur R. Chowdhury

(57) ABSTRACT

A multi-domain liquid crystal display device includes first and second substrates, a plurality of gate lines on the first substrate in a first direction, a plurality of data lines formed in a second direction to cross the first direction, a plurality of thin film transistors formed in a portion where the gate lines cross the data lines, a plurality of pixel regions divided into at least one or more domains between neighboring gate and data lines, a plurality of pixel electrodes in each pixel region to be connected with the thin film transistors, at least one dielectric structure on the second substrate, a plurality of light-shielding layers formed in a boundary region of the domains and a region where the dielectric structure exists, on at least one of the first and second substrates, an alignment film on at least one of the first and second substrates, and a liquid crystal layer between the first substrate and the second substrate.

64 Claims, 27 Drawing Sheets

MULTI-DOMAIN LIQUID CRYSTAL DISPLAY DEVICE HAVING A DIELECTRIC STRUCTURE CONTROLLING ALIGNMENT OF THE LIQUID CRYSTAL MOLECULES

This application claims the benefit of Korean Patent Application No. 1999-63987, filed on Dec. 28, 1999, which is hereby incorporated by reference.

BACKGROUND OF THE INVENTION

1. Field of the Invention

The present invention relates to a liquid crystal display device, more particularly, to a multi-domain liquid crystal display device in which a common auxiliary electrode, a dielectric structure and/or an electric field induction window are formed around and/or within a pixel region to divide the pixel region into a plurality of domains, and a light-shielding layer is formed in a boundary region of the divided domains.

2. Discussion of the Related Art

Recently, a liquid crystal display device that drives a liquid crystal using an auxiliary electrode electrically insulated from a pixel electrode without aligning the liquid crystal has been suggested. Such a related art liquid crystal display device is described with reference to FIG. 1.

FIG. 1 is a sectional view of a unit pixel of the related art liquid crystal display device. The related art liquid crystal display device includes a first substrate, a second substrate, a plurality of data lines and gate lines and a thin film transistor. As shown in FIG. 1, the liquid crystal display device further includes a passivation film 37, a pixel electrode 13, and an auxiliary electrode 21. The data lines and gate lines are formed on the first substrate lengthwise and crosswise to divide the first substrate into a plurality of pixel regions. A thin film transistor is formed in each pixel region on the first substrate and includes a gate electrode, a gate insulating film, a semiconductor layer, an ohmic contact layer, and source/drain electrodes. The passivation film 37 is formed on the entire surface of the first substrate. The pixel electrode 13 is formed on passivation film 37 to be connected with the drain electrode. The auxiliary electrode 21 is formed on the gate insulating film to partially overlap the pixel electrode 13.

The related art liquid crystal display device further includes a light-shielding layer 25, a color filter layer 23 formed on the light-shielding layer 25, a common electrode 17 formed on the color filter layer 23, and a liquid crystal layer formed between the first substrate and the second substrate. The light-shielding layer 25 is formed on the second substrate to shield light leaked from the gate lines, the data lines, and the thin film transistor.

An open region or gap 27 may be formed in the common electrode 17 to distort electric field applied to the liquid crystal layer. The auxiliary electrode 21 formed around the pixel electrode 13 and the open region 27 of the common electrode 17, distort the electric field applied to the liquid crystal layer so that liquid crystal molecules are variously driven within a unit pixel. This is intended so that a dielectric energy by the distorted electric field places a liquid crystal director at a desired position when a voltage is applied to the liquid crystal display device. The liquid crystal display device requires the open region 27 or gap in the common electrode 17 to obtain multi-domain effect. To this end, a process for patterning the common electrode is additionally required.

Furthermore, if the open region 27 is not formed or has a small width, distortion range of the electric field required to divide the domain is weak. Accordingly, there is a problem at the time when the liquid crystal director reaches a stable state, it is relatively increased. Leakage of light occurs due to the open region, i.e., the boundary region between the domains, when displaying an image on a screen. For this reason, disclination occurs, thereby deteriorating contrast.

SUMMARY OF THE INVENTION

Accordingly, the present invention is directed to a multi-domain liquid crystal display device that substantially obviates one or more of the problems due to limitations and disadvantages of the related art.

An object of the present invention is to provide a multi-domain liquid crystal display device in which a common auxiliary electrode, a dielectric structure and/or an electric field induction window are formed around and/or within a pixel region to divide the pixel region into a plurality of domains, thereby improving a viewing angle.

Another object of the present invention is to provide a multi-domain liquid crystal display device in which a light-shielding layer is formed in a boundary region of divided domains to prevent leakage of light from occurring, thereby improving contrast.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

A multi-domain liquid crystal display device of the present invention is an improvement over the device of Korean Patent Application No. 1999-05587, filed by the same applicant, in which a dielectric structure and/or an electric field induction window are formed around and/or within a pixel region to divide the pixel region into a plurality of domains, and a light-shielding layer is formed in a boundary region of the domains on an upper substrate and/or a lower substrate.

To achieve these and other advantages and in accordance with the purpose of the present invention, as embodied and broadly described, a multi-domain liquid crystal display device according to the present invention includes: first and second substrates; a plurality of gate lines formed on the first substrate in a first direction; a plurality of data lines formed in a second direction to cross the first direction; a plurality of thin film transistors formed in a portion where the gate lines cross the data lines; a plurality of pixel regions divided into at least one or more domains between neighboring gate and data lines; a plurality of pixel electrodes in each pixel region to be connected with the thin film transistors; at least one dielectric structure on the second substrate; a plurality of light-shielding layers formed in a boundary region of the domains and a region where the dielectric structure exists, on at least one of the first and second substrates; an alignment film on at least one of the first and second substrates; and a liquid crystal layer between the first substrate and the second substrate.

The multi-domain liquid crystal display device further includes at least one or more electric field induction windows within the pixel electrodes, and a common auxiliary electrode around each pixel region.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
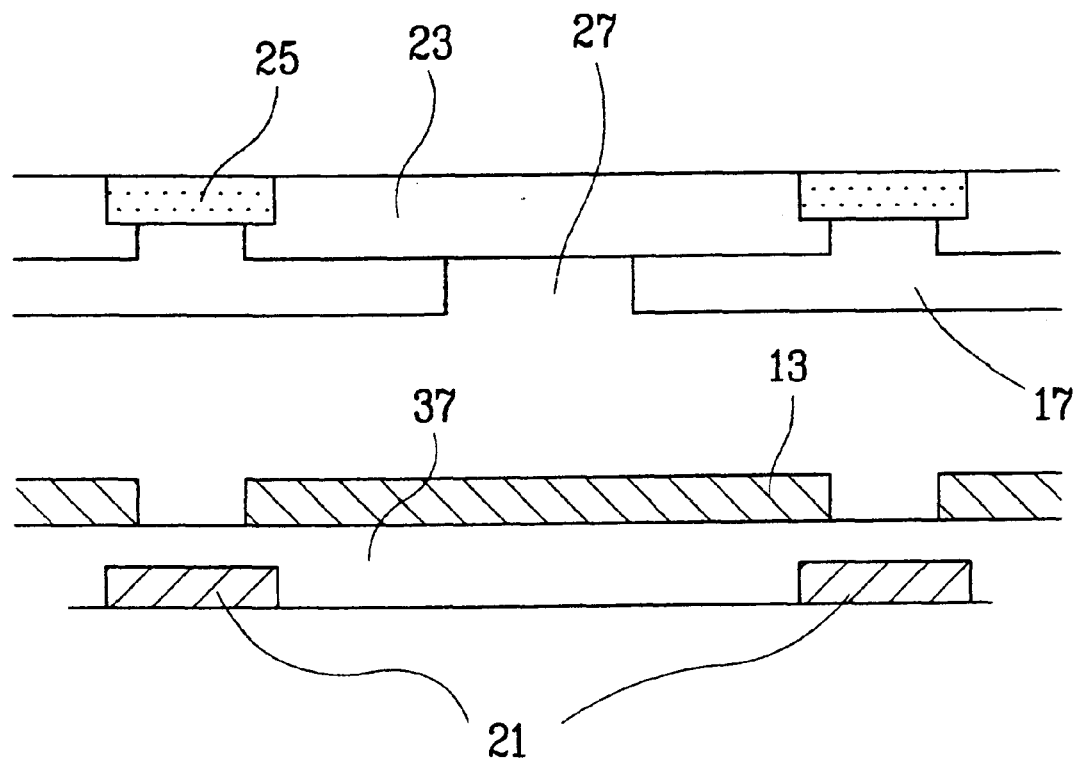
FIG. 1 is a sectional view showing a related art liquid crystal display device.
Figure 2A:
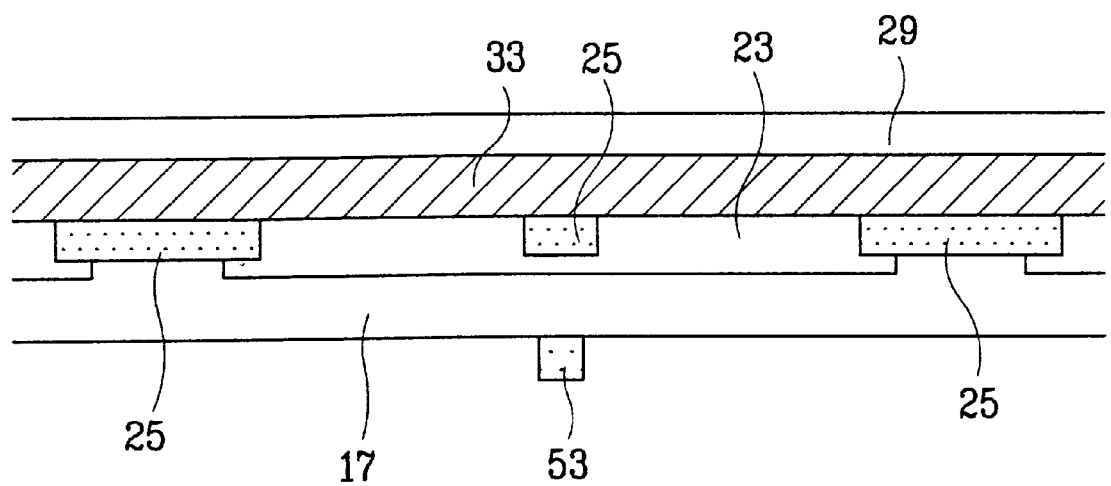
FIGS. 2A and 2B are sectional views showing a multi-domain liquid crystal display device according to the first embodiment of the present invention.
Figure 2A:
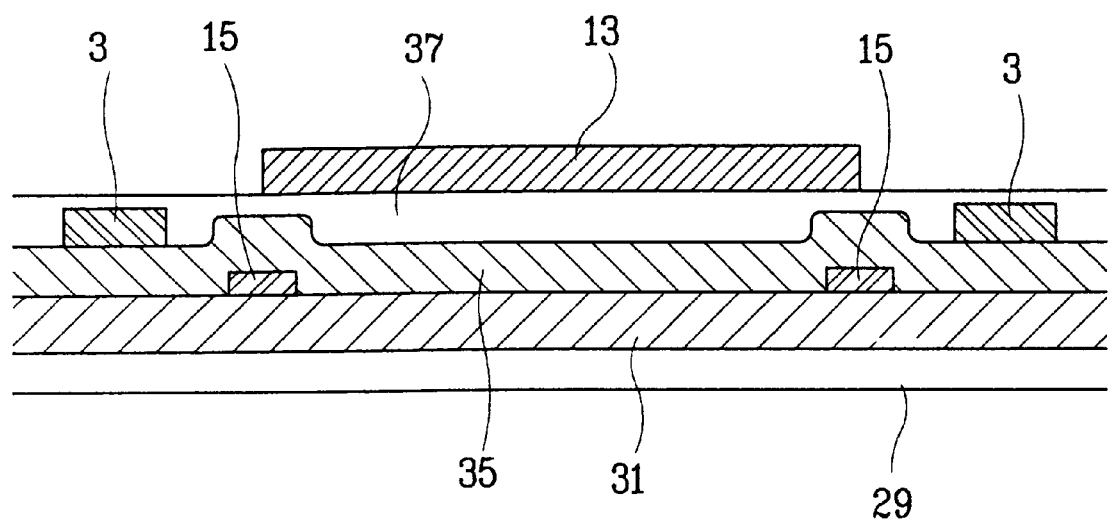
Figure 2B:
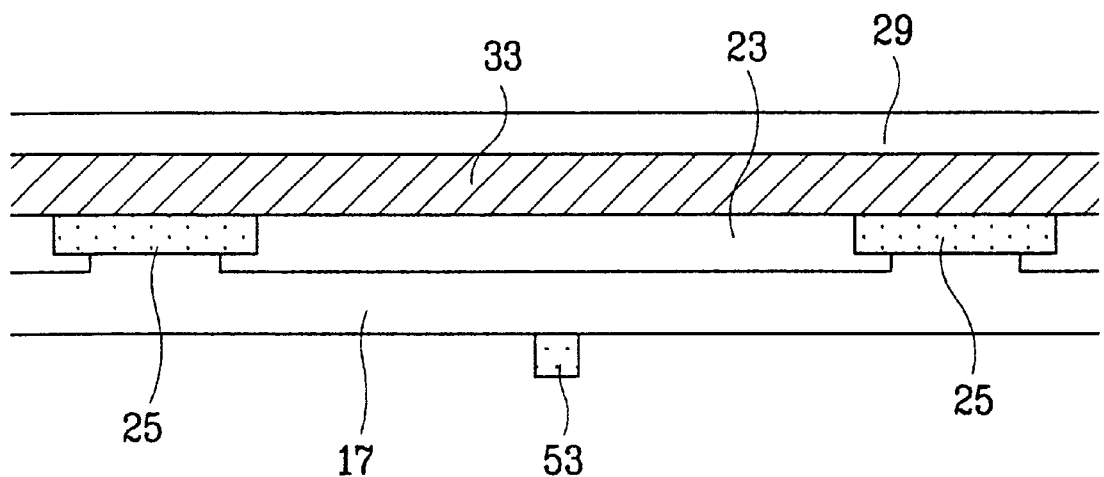
Figure 2B:
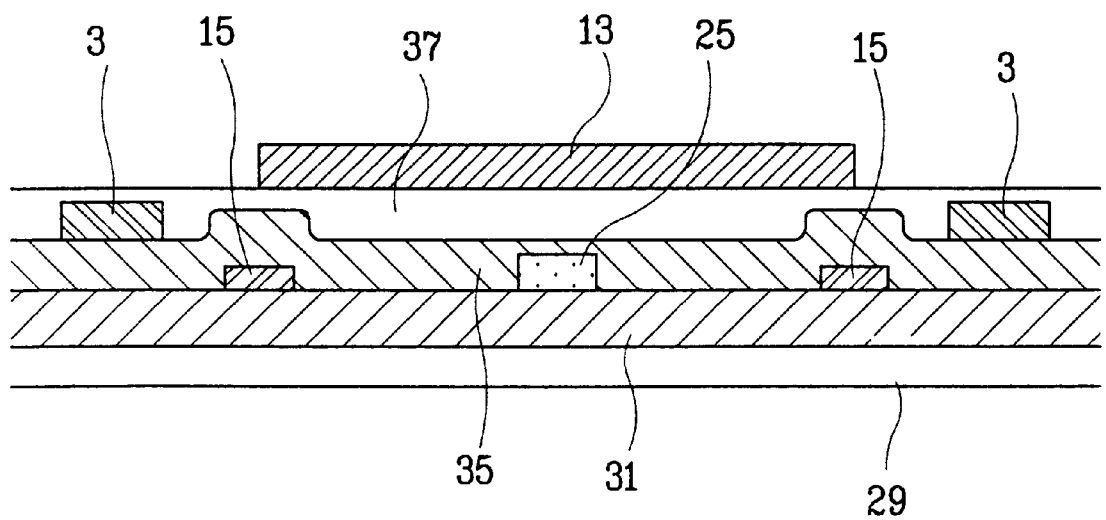
Figure 3A:
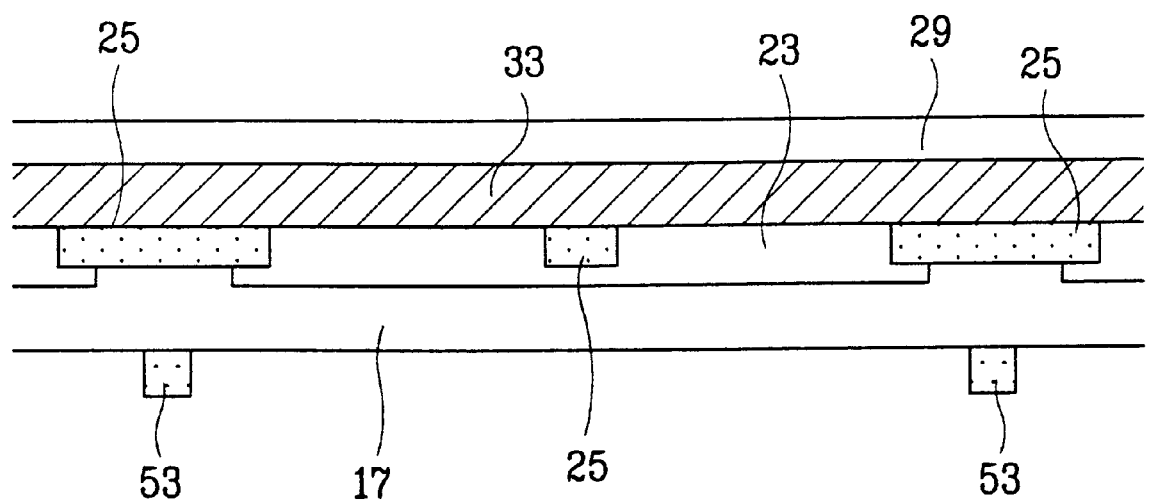
FIGS. 3A and 3B are sectional views showing a multi-domain liquid crystal display device according to the second embodiment of the present invention.
Figure 3A:
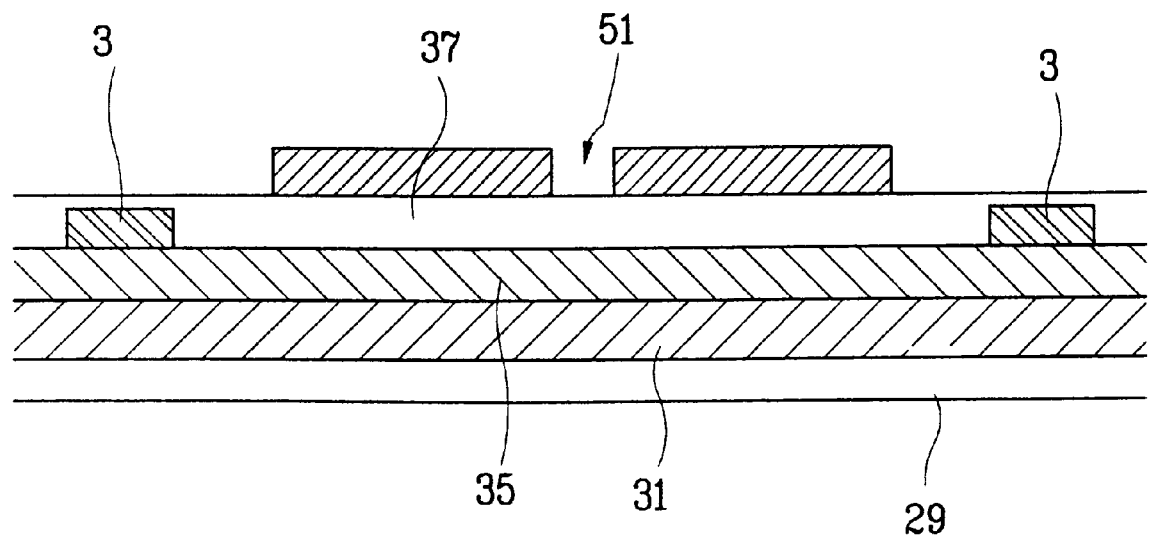
Figure 3B:
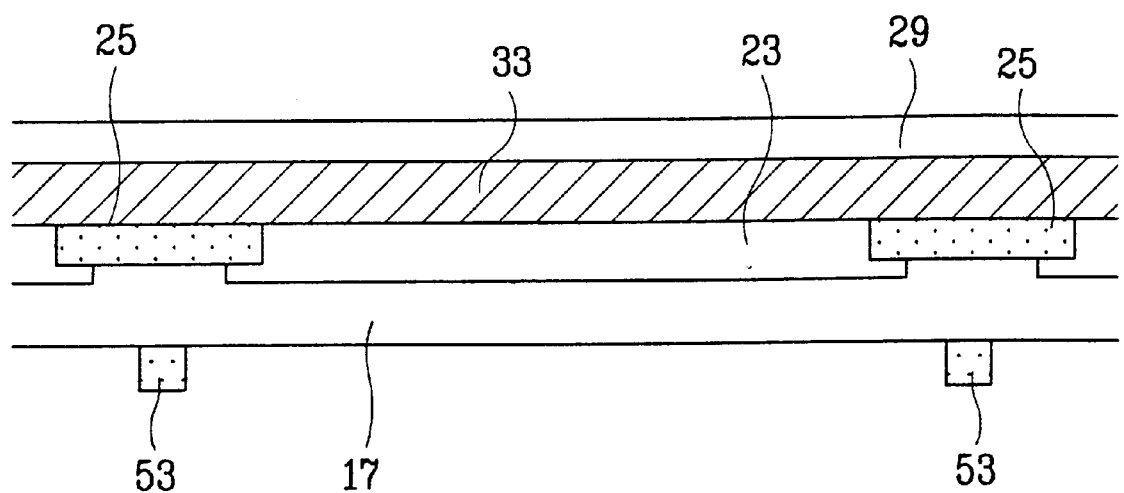
Figure 3B:
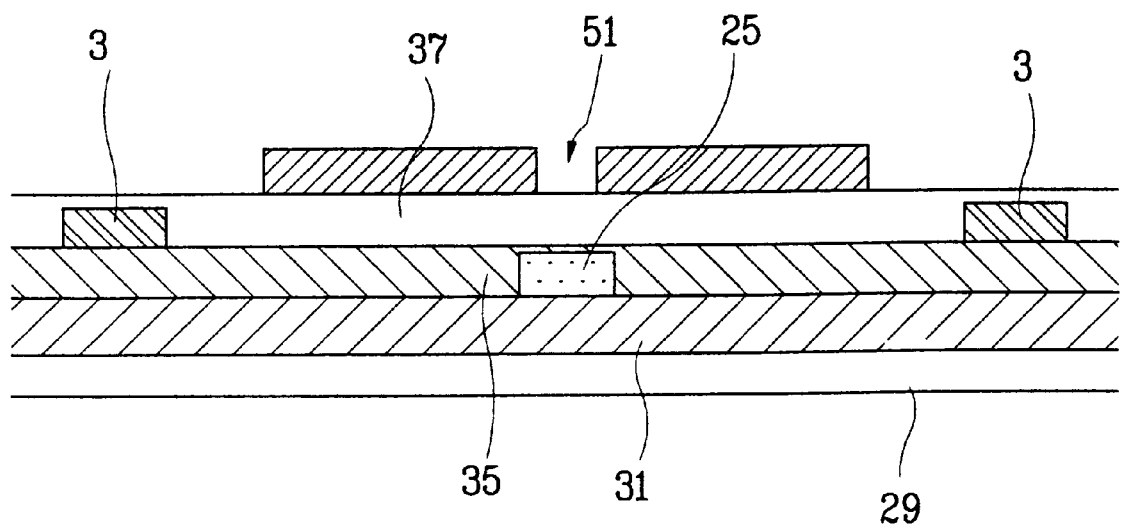
Figure 4A:
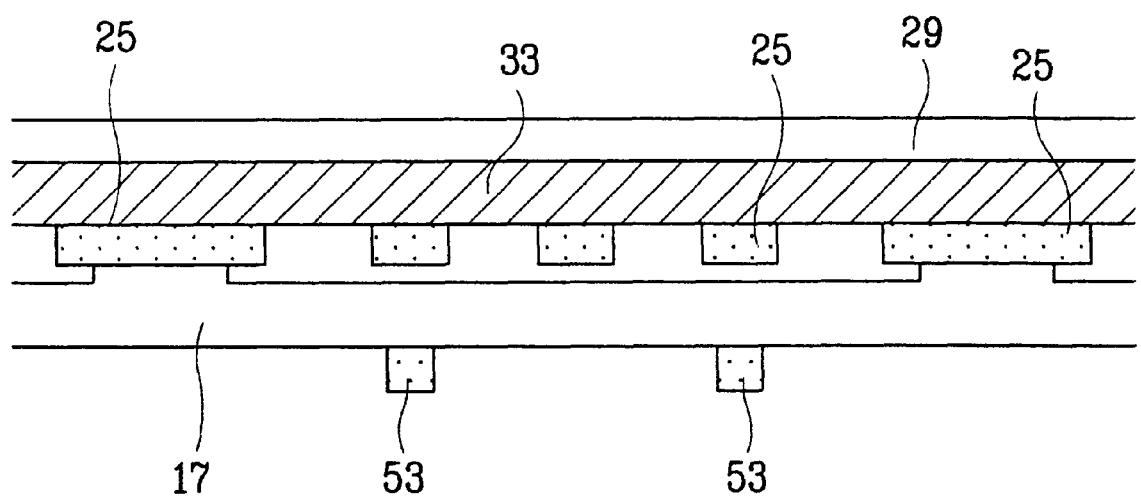
FIGS. 4A and 4B are sectional views showing a multi-domain liquid crystal display device according to the third embodiment of the present invention.
Figure 4A:
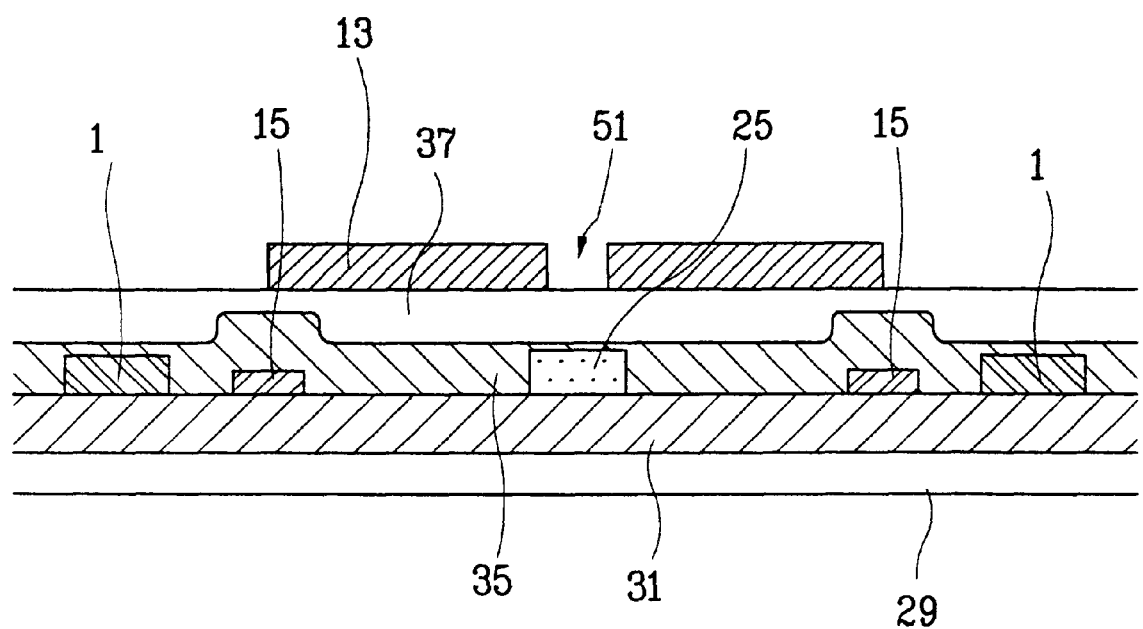
Figure 4B:
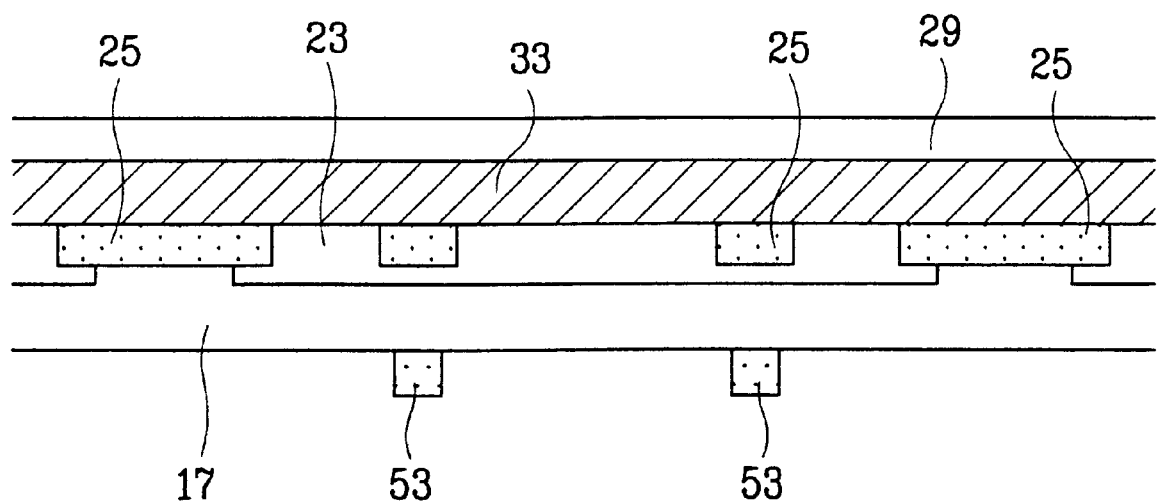
Figure 4B:
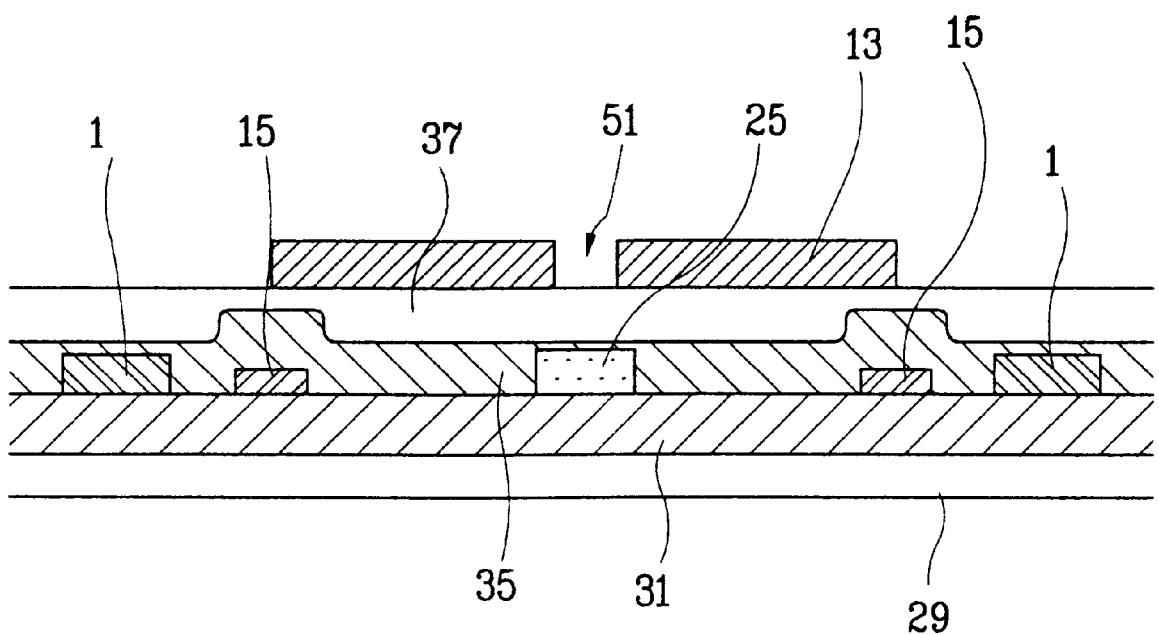

Reference will now be made in detail to the preferred embodiments of the present invention, examples of which are illustrated in the accompanying drawings.

In the present invention, a two-domain liquid crystal display device will be described with reference to the first and second embodiments while a four-domain liquid crystal display device will be described with reference to the third and fourth embodiments.

Referring to FIGS. 2 to 5, a multi-domain liquid crystal display device of the present invention includes a first substrate 31, a second substrate 33, a plurality of data lines 3 and gate lines 1, a common auxiliary electrode 15, a thin film transistor, a passivation film 37, and a pixel electrode 13. The data lines 3 and gate lines 1 are formed on the first substrate 31 lengthwise and crosswise to divide the first substrate into a plurality of pixel regions. The common auxiliary electrode 15 is formed around and within the pixel regions on the same layer as the gate lines. The thin film transistor is formed in each pixel region on the first substrate and includes a gate electrode 11, a gate insulating film 35, a semiconductor layer, an ohmic contact layer, and source/drain electrodes. The passivation film 37 is formed on an entire surface of the first substrate 31. The pixel electrode 13 is formed on the passivation film 37 to be connected with the drain electrode.

The multi-domain liquid crystal display device further includes at least one or more electric field induction windows 51 within the pixel electrode 13 to compensate electric field formed in the liquid crystal display device.

The multi-domain liquid crystal display device further includes a light-shielding layer 25, a color filter layer 23 formed on the light-shielding layer 25, a common electrode 17 formed on the color filter layer 25, and a liquid crystal layer formed between the first substrate 31 and the second substrate 33. The light-shielding layer 25 is formed on the second substrate 33 to shield light leaked from the gate lines 1, the data lines 3 and the thin film transistor.

At least one dielectric structure 53 is formed within and/or around the pixel region on the common electrode 17 to divide one pixel into a plurality of domains. Around the pixel region are the gate lines and/or the data lines. The light-shielding layer is formed in a region within the pixel region where the dielectric structure 53 and the electric field induction windows 51 are formed, i.e., in a boundary region of each domain, so that leakage of light is prevented from occurring on the first substrate and/or the second substrate.

To fabricate the aforementioned multi-domain liquid crystal display device, the thin film transistor consisting of the gate electrode, the gate insulating film 35, the semiconductor layer, the ohmic contact layer and the source/drain electrodes is formed in each pixel region on the first substrate 31. At this time, the plurality of gate lines 1 and data lines 3 are formed to divide the first substrate 31 into a plurality of pixel regions.

The gate electrode 11 and the gate lines 1 are formed in such a manner that a metal such as Al, Mo, Cr, Ta, Al alloy, or a double layer of two of these metals, is layered by sputtering method and patterned. At the same time, the common auxiliary electrode 15 is formed around and/or within the pixel region. The common auxiliary electrode 15 is formed by at least one in one pixel, and conducted to the common auxiliary electrode of a neighboring pixel.

When the common auxiliary electrode 15 is formed of the same material as that of the gate lines 1, the common auxiliary electrode 15 is formed on the same layer as the gate lines 1 using the same mask and electrically connected with the common electrode 17. Alternatively, the common auxiliary electrode 15 may be formed of a metal different from the material of the gate lines using an additional mask. Also, the common auxiliary electrode 15 may be formed as a double layer with different materials.

Subsequently, the gate insulating film 35 is formed in such a manner that $SiN_x$ or $SiO_x$ is deposited on the gate electrode, the common auxiliary electrode 15 and the gate lines 1 by plasma enhancement chemical vapor deposition (PECVD). The semiconductor layer and the ohmic contact layer are formed in such a manner that a-Si and n$^+$ a-Si are deposited by PECVD and patterned.

Alternatively, the semiconductor layer and the ohmic contact layer are formed in such a manner that a-Si and n$^+$ a-Si are patterned after $SiN_x$ (or $SiO_x$), a-Si and n$^+$ a-Si are successively deposited.

A metal such as Al, Mo, Cr, Ta, Al alloy, or a double layer of two of these metals, is layered by the sputtering and then patterned so that the data lines 3 and the source/drain electrodes are formed. At this time, a storage electrode is formed to overlap the gate lines 1 and/or the common auxiliary electrode 15. The storage electrode acts as a storage capacitor together with the gate lines 1 and/or the common auxiliary electrode 15.

Subsequently, the passivation film 37 is formed of a material such as benzocyclobutene (BCB), acrylic resin, polyimide compound, $SiN_x$ or $SiO_x$ on the whole first substrate 31. Indium tin oxide (ITO) is deposited by the sputtering and patterned to form the pixel electrode 13.

Also, the gate insulating film 35 may be formed of BCB, acrylic resin or polyimide compound in order to increase an aperature ratio.

At this time, the storage electrode is extended toward the pixel electrode 13 to partially overlap the pixel electrode 13, and a contact hole is formed by removing the passivation film 37 beneath the overlap portion. Thus, the pixel electrode 13 is electrically connected with the storage electrode. Furthermore, the passivation film 37 on the drain electrode is selectively removed to form the contact hole so that the pixel electrode 13 is connected with the drain electrode through the contact hole.

At the same time, at least one or more electric field induction windows 51 are formed within the pixel electrode 13. The electric field induction windows have a predetermined or specific shape. The electric field induction windows 51 act to compensate the electric field formed by the common auxiliary electrode 15. Thus, response time of the liquid crystal display device can be reduced.

Alternatively, the pixel electrode 13 may be formed to partially overlap the common auxiliary electrode 15 so that the storage capacitor can be extended. In this case, uneven electric field intensity is controlled to remove disclination.

Additionally, an alignment film (not shown) may be formed on the pixel electrode 13.

In the embodiments of the multi-domain liquid crystal display device according to the present invention an L-shaped thin film transistor structure having high aperture ratio is provided. By forming the L-shaped thin film transistor on the gate lines 1, aperture ratio can be improved as compared with the related art liquid crystal display device, and parasitic capacitance generated between the gate line 1 and the drain electrode can be reduced.

Also, the thin film transistor may be formed in a U-shape. Namely, the U-shaped thin film transistor having a source electrode which surrounds a drain electrode may be formed in a portion of the pixel region adjacent to where the gate lines cross the data lines.

The light-shielding layer 25 is formed on the second substrate 33, and the color filter layer 23 is formed to repeat R(red), G(green) and B(blue) elements for each pixel. The common electrode 17 is formed of a transparent electrode such as ITO in the same manner as the pixel electrode 13. A photoresist material is deposited on the common electrode 17 and patterned by photolithography to form at least one or more dielectric structures 53 having various shapes. The dielectric structures 53 are formed within and/or around the pixel region. Additionally, an alignment film (not shown) may be formed on the dielectric structures 53.

Subsequently, a liquid crystal is injected between the first substrate 31 and the second substrate 33 so that a multi-domain liquid crystal display device is completed. The liquid crystal constituting the liquid crystal layer has a positive dielectric anisotropy or a negative dielectric anisotropy. The liquid crystal may include a chiral dopant. Also, the multi-domain liquid crystal display device of the present invention is applicable to various liquid crystal modes. Among the liquid crystal modes, it is most preferable to use a twisted nematic liquid crystal.

Preferably, the dielectric structures 53 have dielectric constants equal to or smaller than the dielectric constant of the liquid crystal layer, and more preferably 3 or below. A material such as photoacrylate or BCB may be used as the dielectric structures.

To apply a voltage $V_{com}$ to the common auxiliary electrode 15, an Ag-Dotting portion is formed in each corner of a driving region of the liquid crystal display device on the first substrate 31. The process for forming the Ag-Dotting portion is performed simultaneously with forming the common auxiliary electrode 15. The electric field is applied to the second substrate 33 to drive the liquid crystal by the potential difference between upper and lower substrates. The Ag-Dotting portion of each corner is connected with the common auxiliary electrode 15. Thus, the voltage $V_{com}$ is applied to the common auxiliary electrode 15.

The light-shielding layer 25 is additionally formed in a region where the dielectric structures 53 and the electric field induction windows 51 are formed, i.e., in a boundary region of each domain, on the first substrate and/or the second substrate. The light-shielding layer 25 is formed of a material such as Cr, $CrO_x$, or resin. Also, the light-shielding layer 25 may electrically be floating, or the voltage $V_{com}$ may be applied to the light-shielding layer 25 in the same manner as the common auxiliary electrode 25. In this case, the light-shielding layer 25 acts to prevent leakage of light from occurring and also acts as a separate common auxiliary electrode.

In addition, if the dielectric structure is formed of black resin, the dielectric structure acts as the light-shielding layer. In this case, the light-shielding layer 25 is not additionally required on the first substrate and/or the second substrate.

Polymers are formed on at least one of the first substrate 31 and the second substrate 33 so that a phase difference film 29 is formed. The phase difference film 29 is a negative uniaxial film. The phase difference film acts to compensate phase differences seen at various viewing angles or by a user from a direction vertical to the substrate. Therefore, a region having no gray inversion is expanded, contrast ratio in tilt direction increases, and a multi-domain is formed with one pixel. Thus, a viewing angle in left and right direction can effectively be compensated.

In addition to the negative uniaxial film, a negative biaxial film may be used as the phase difference film 29. The negative biaxial film having two axes can obtain viewing angle characteristic wider than the negative uniaxial film.

Subsequently, a polarizer is attached on both substrates. The polarizer may be formed integrally with the phase difference film.

In the multi-domain liquid crystal display device of the present invention, shown in FIGS. 2 and 6, the common auxiliary electrode 15 is formed on the same layer as the gate lines 1; the dielectric structures 53 are formed on the common electrode 17 in various shapes; and the light-shielding layer 25 is formed in a region where the dielectric structures 53 are formed on the first substrate 31 or the second substrate 33. The common auxiliary electrode 15 is formed to surround the pixel region. Alternatively, the common auxiliary electrode 15 is formed only on the gate lines 1 or the data lines 3.

In FIG. 6, a solid line arrow represents an alignment direction of the second substrate 33, while a dotted line arrow represents an alignment direction of the first substrate 31. This convention also applies to FIGS. 7, 8 and 9.

In the multi-domain liquid crystal display device of one embodiment of the present invention, shown in FIGS. 3 and 7, the electric field induction windows 51 are formed within the pixel electrode 13 in various shapes; the dielectric structures 53 are formed on the common electrode 17; and the light-shielding layer 25 is formed in a region where the electric field induction windows 51 are formed on the first substrate 31 or the second substrate 33. The dielectric structures 53 are formed to surround the pixel region. Alternatively, the dielectric structures 53 are formed only on the gate lines 1 or the data lines 3.

In the multi-domain liquid crystal display device of another embodiment of the present invention, shown in FIGS. 4 and 8, the common auxiliary electrode 15 is formed on the same layer as the gate lines 1; the electric field induction windows 51 are formed within the pixel electrode 13; the dielectric structures 53 are formed on the common electrode 17 in various shapes; and the light-shielding layer 25 is formed in a region where the electric field induction windows 51 and the dielectric structures 53 are formed on the first substrate 31 or the second substrate 33. The common auxiliary electrode 15 is formed to surround the pixel region. Alternatively, the common auxiliary electrode 15 is formed only on the gate lines 1 or the data lines 3.

Figure 5A:
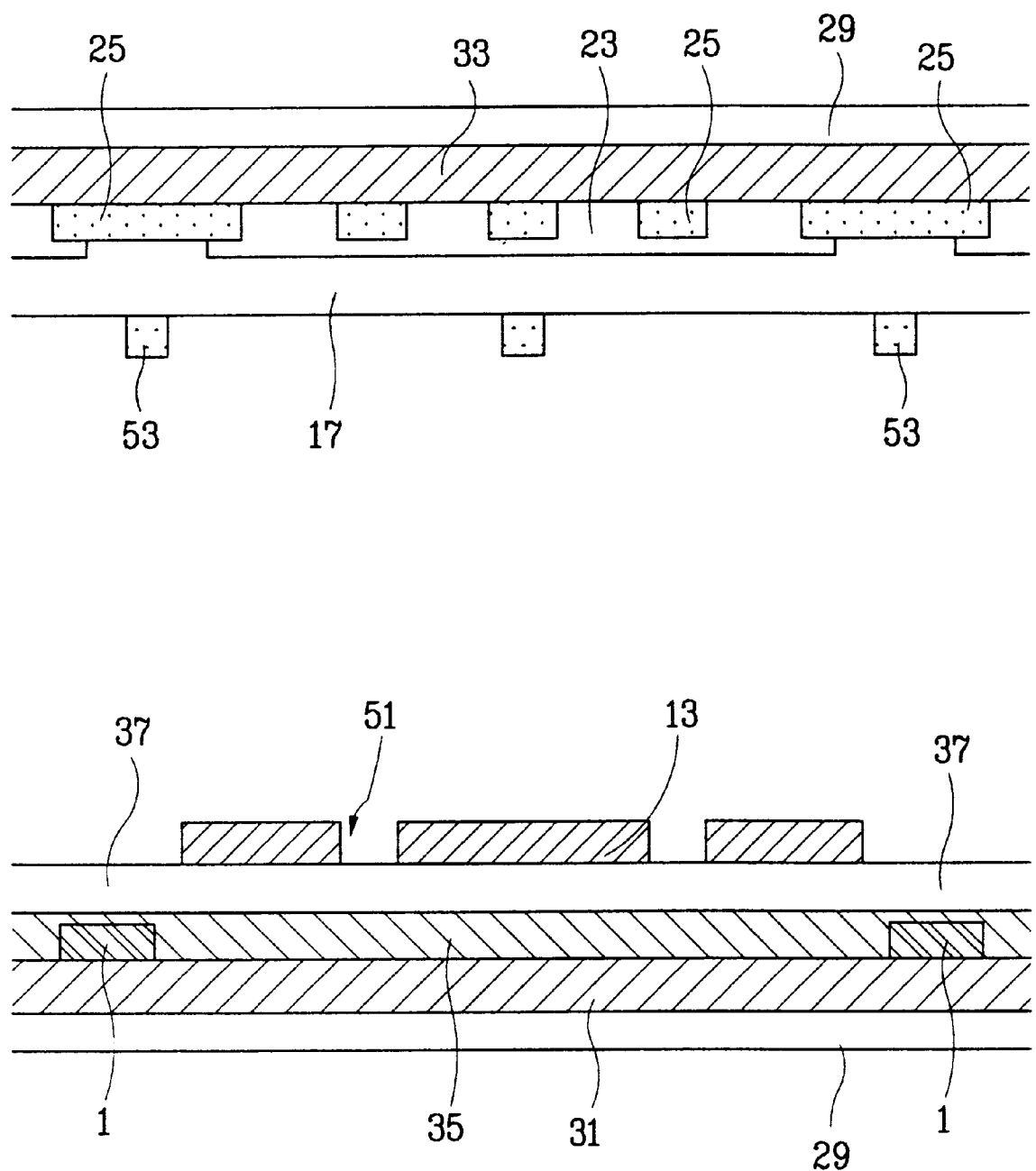
FIGS. 5A and 5B are sectional views showing a multi-domain liquid crystal display device according to the fourth embodiment of the present invention.
Figure 5B:
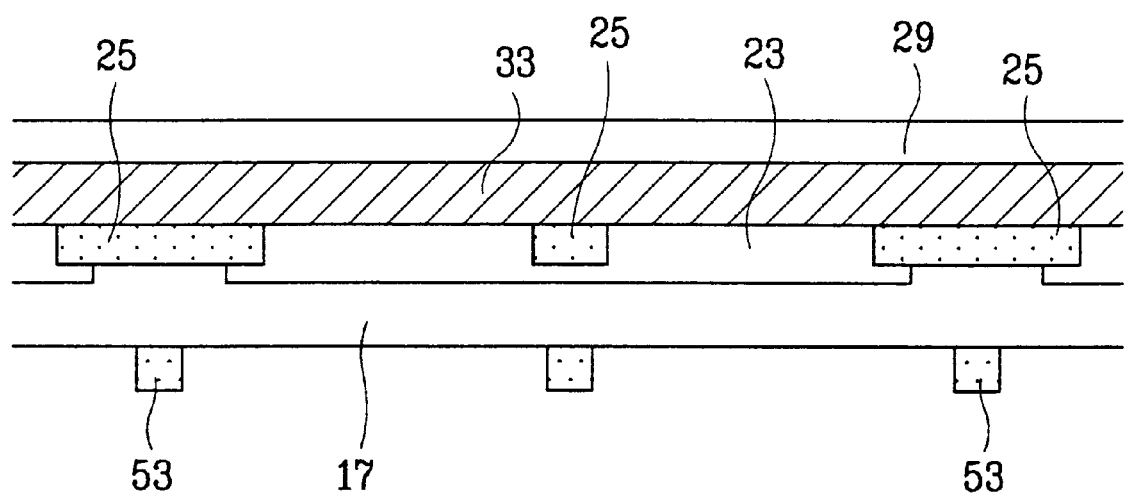
Figure 5B:
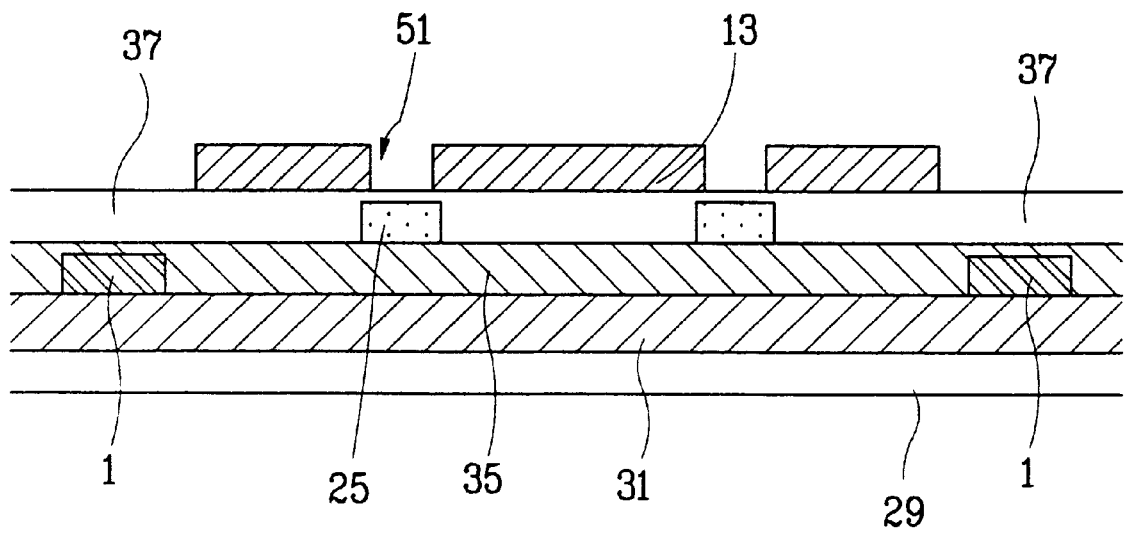
Figure 6A:
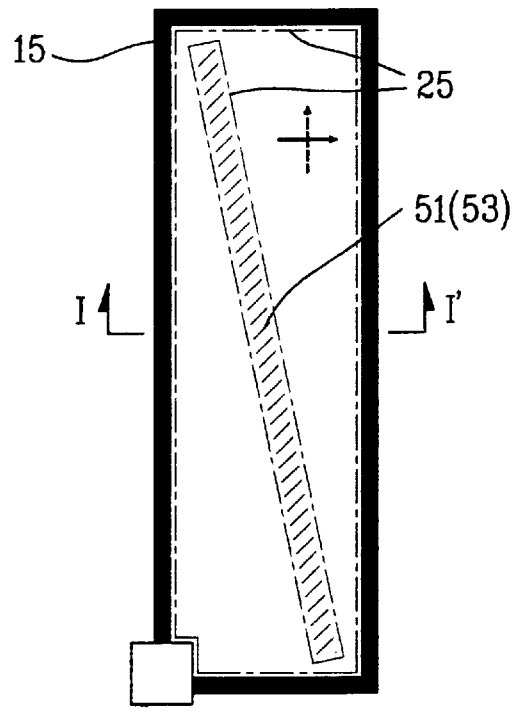
FIGS. 6A to 6L are plan views showing a multi-domain liquid crystal display device according to the first embodiment of the present invention.
Figure 6B:
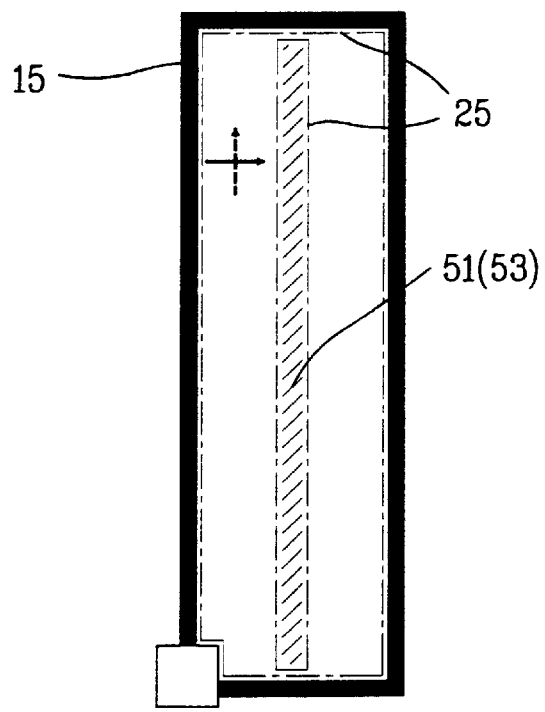
Figure 6C:
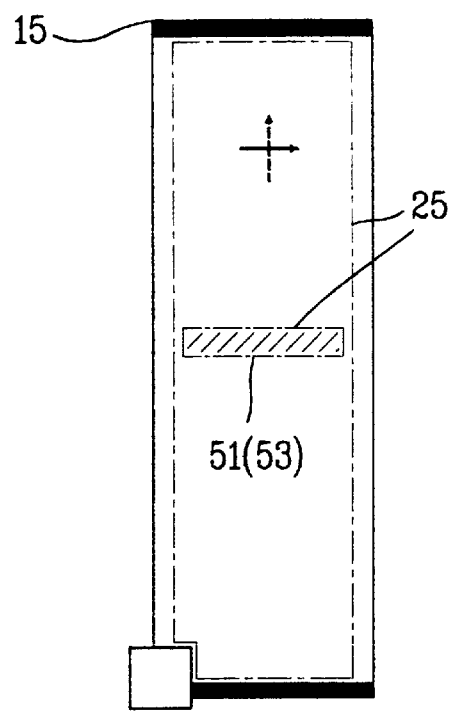
Figure 6D:
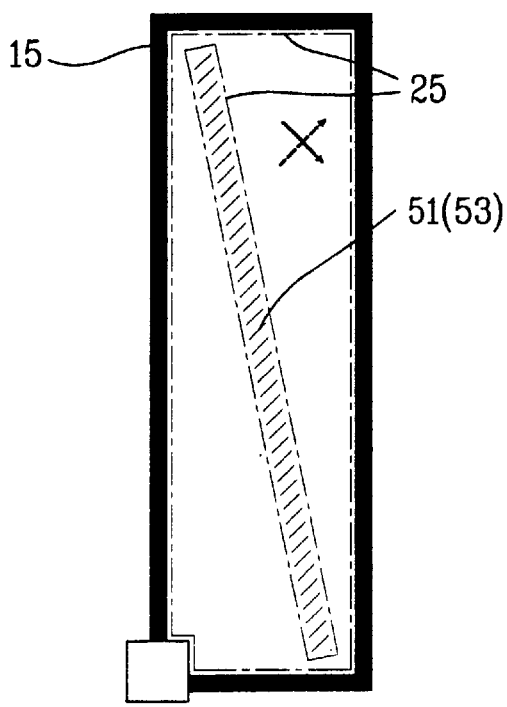
Figure 6E:
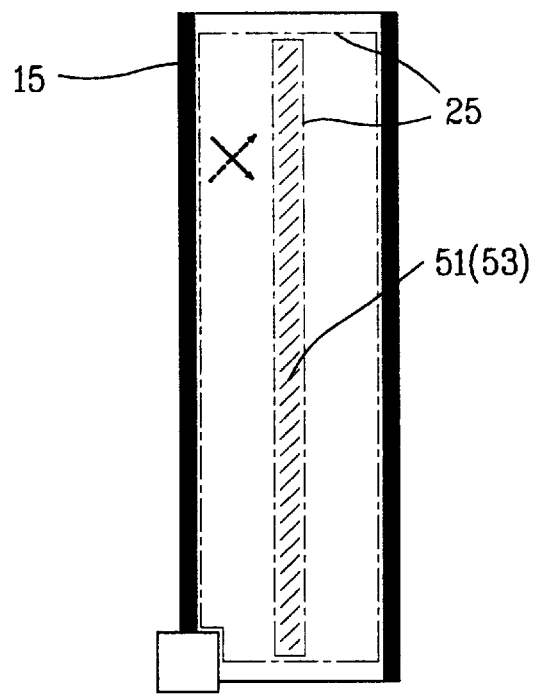
Figure 6F:
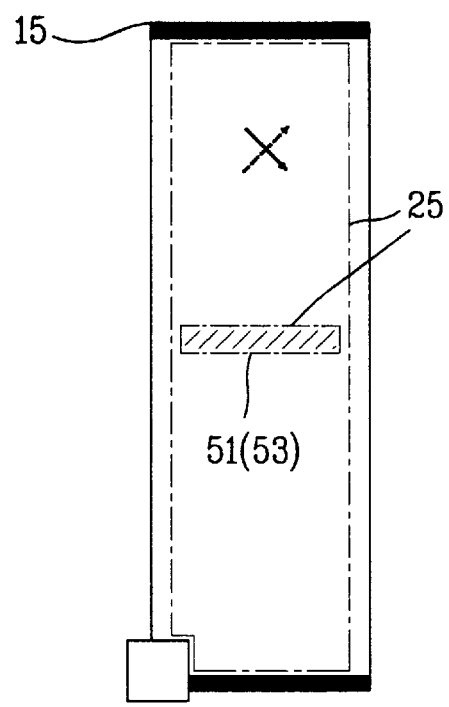
Figure 6G:
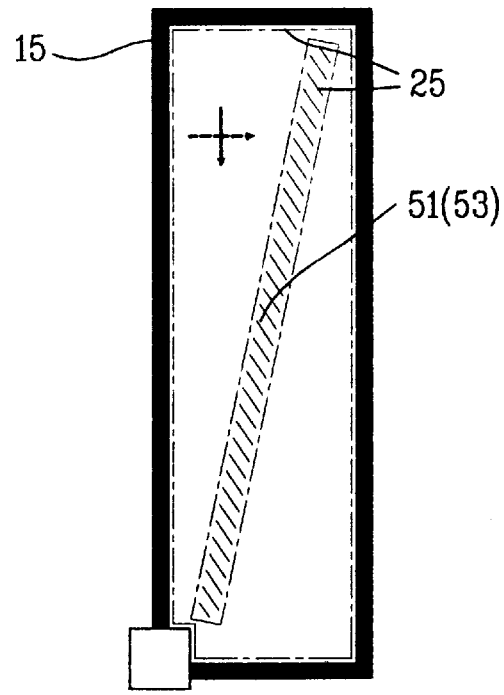
Figure 6H:
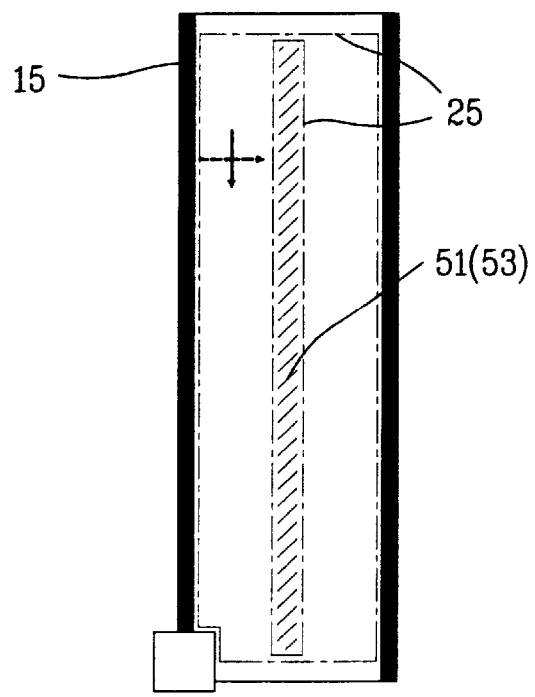
Figure 6I:
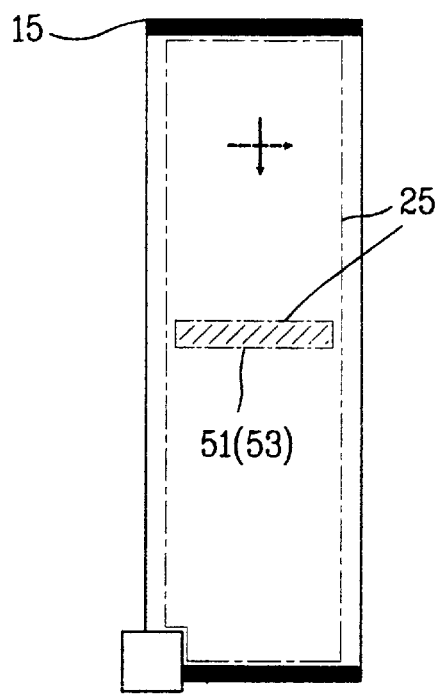
Figure 6J:
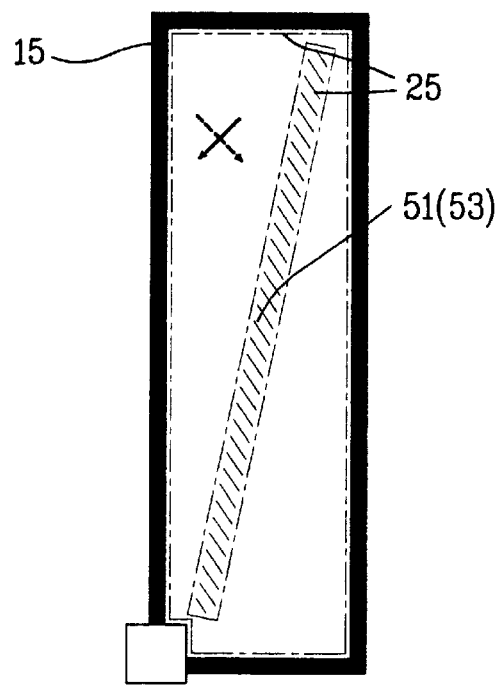
Figure 6K:
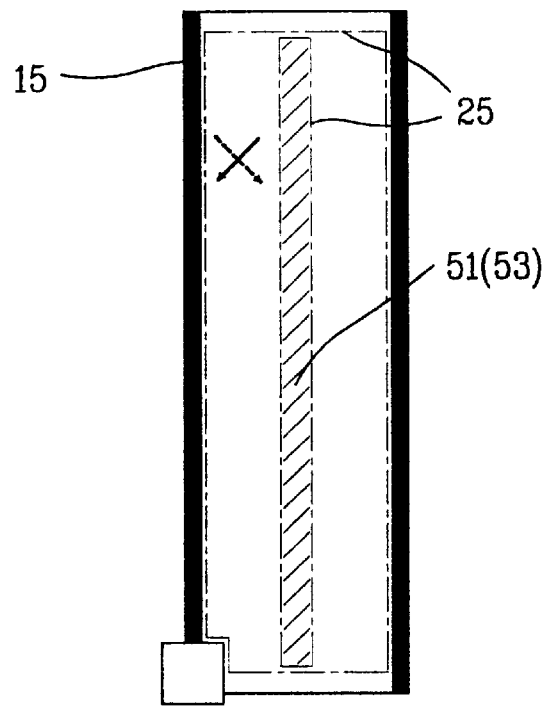
Figure 6L:
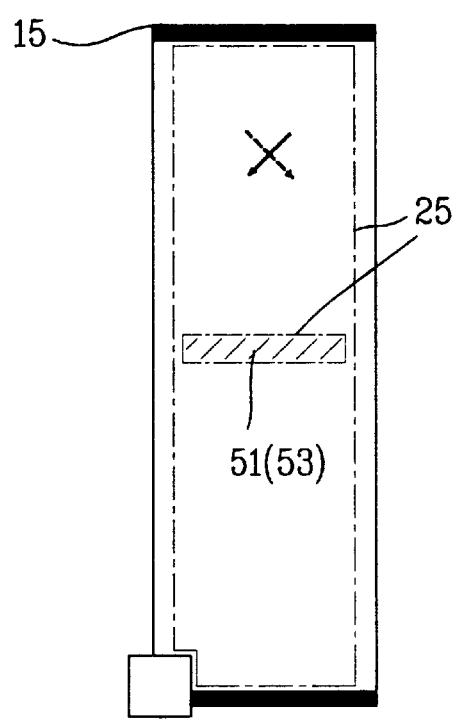
Figure 7A:
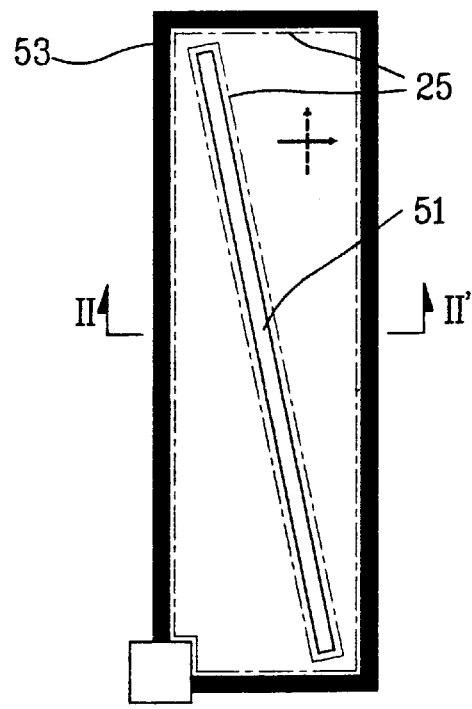
FIGS. 7A to 7L are plan views showing a multi-domain liquid crystal display device according to the second embodiment of the present invention.
Figure 7B:
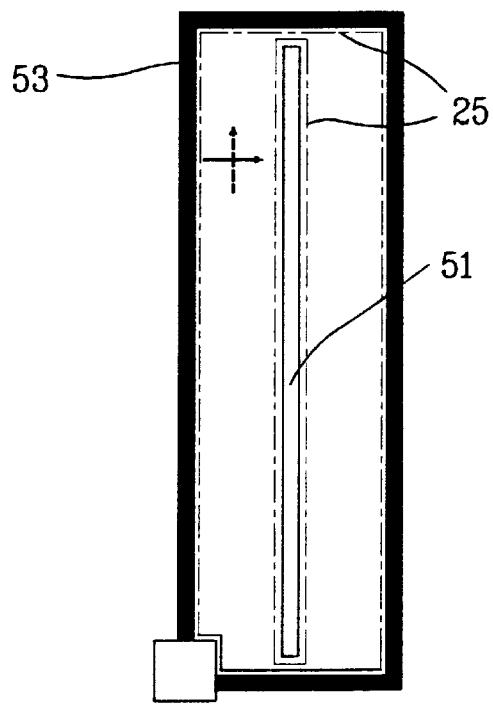
Figure 7C:
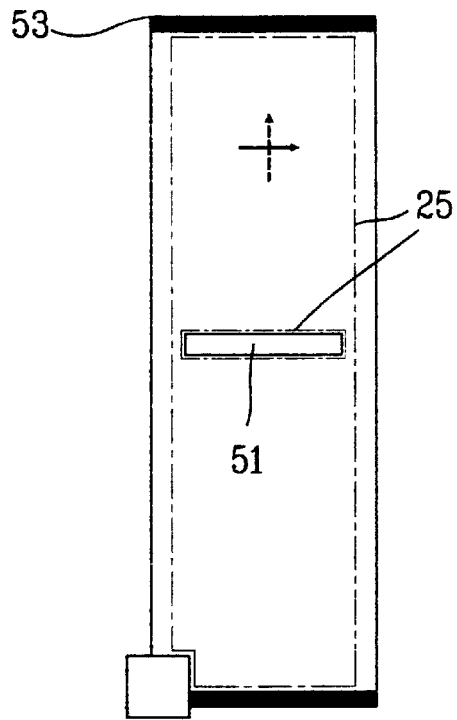
Figure 7D:
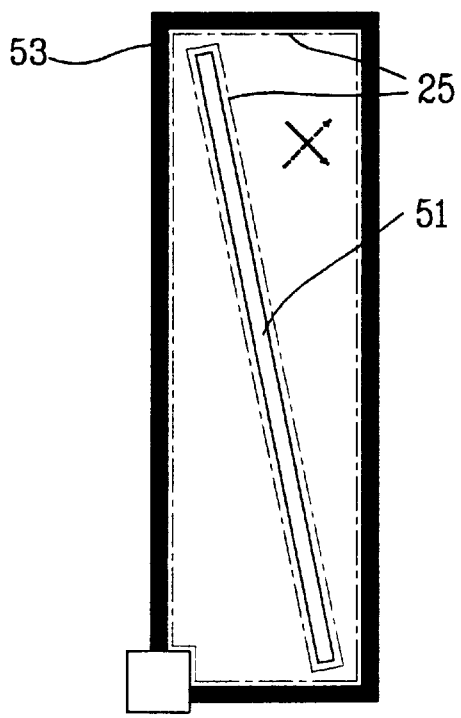
Figure 7E:
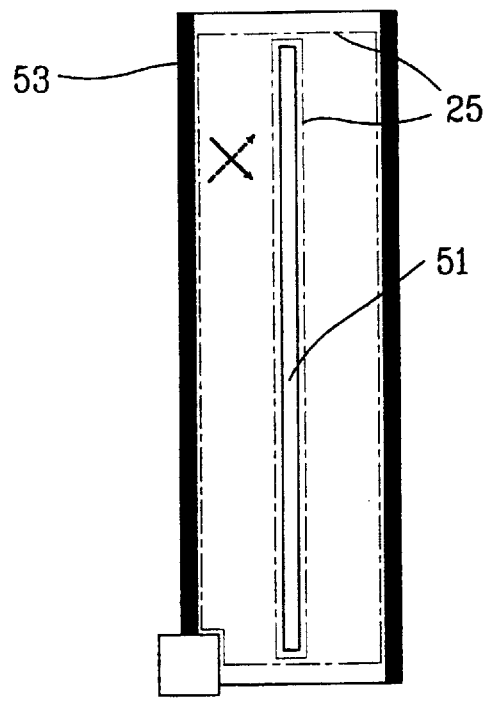
Figure 7F:
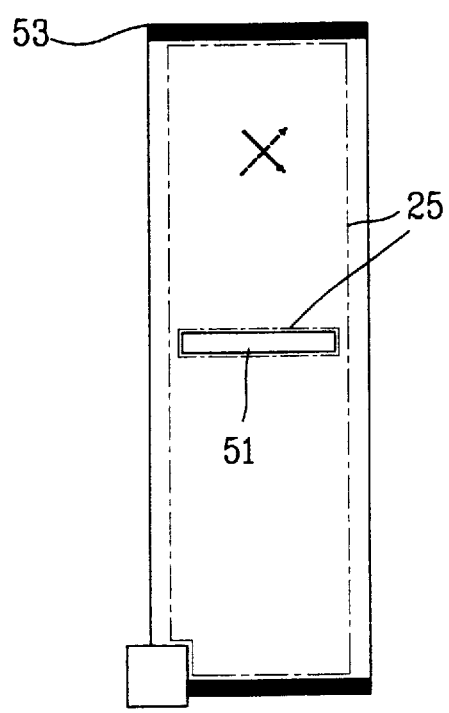
Figure 7G:
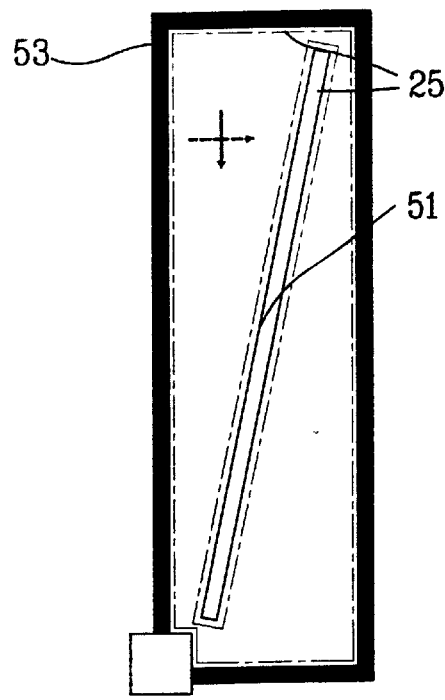
Figure 7H:
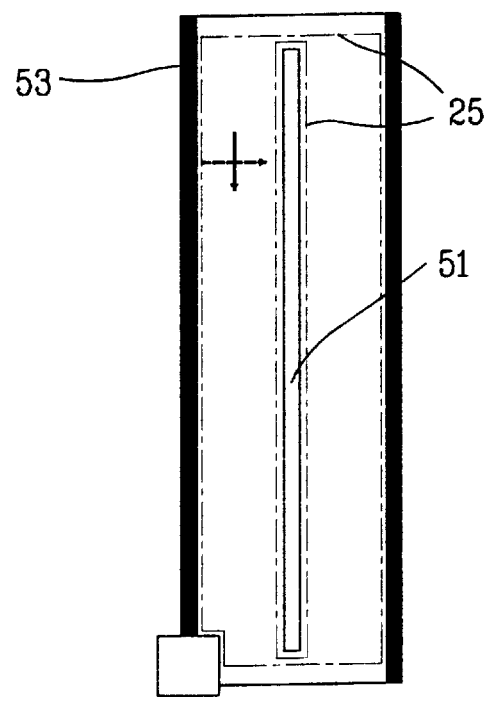
Figure 7I:
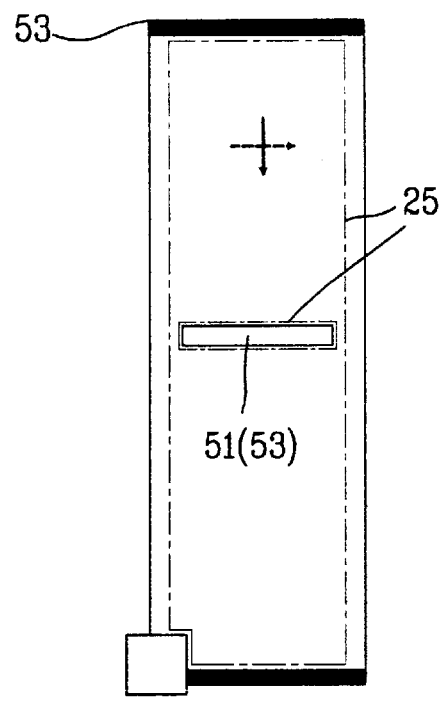
Figure 7J:
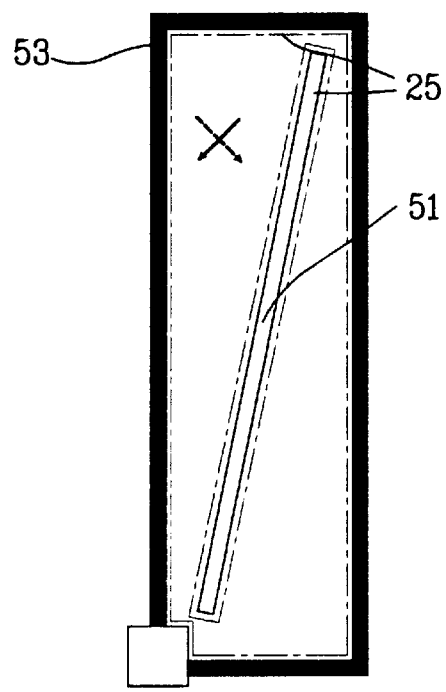
Figure 7K:
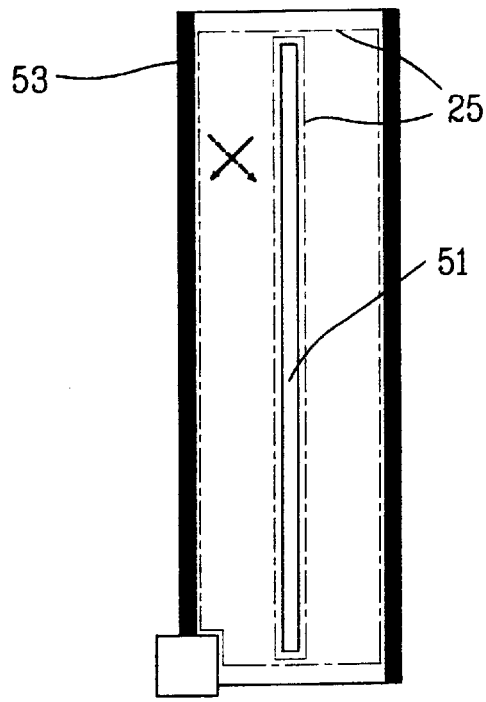
Figure 7L:
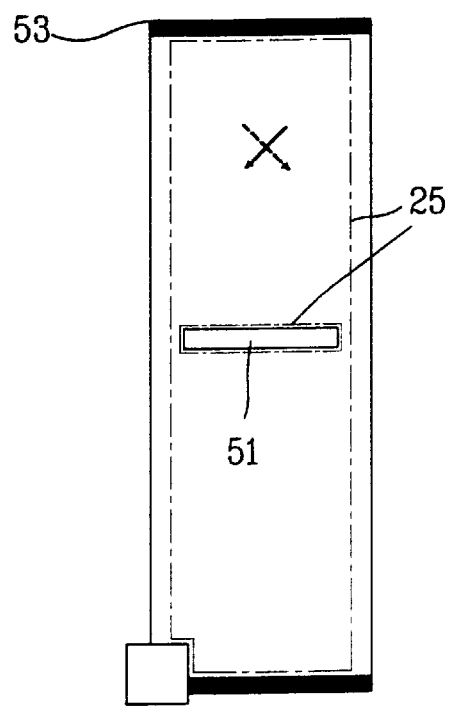
Figure 8A:
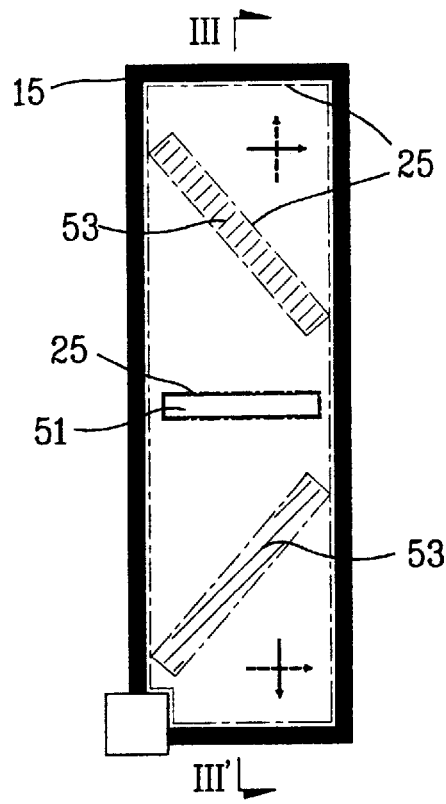
FIGS. 8A to 8F are plan views showing a multi-domain liquid crystal display device according to the third embodiment of the present invention.
Figure 8B:
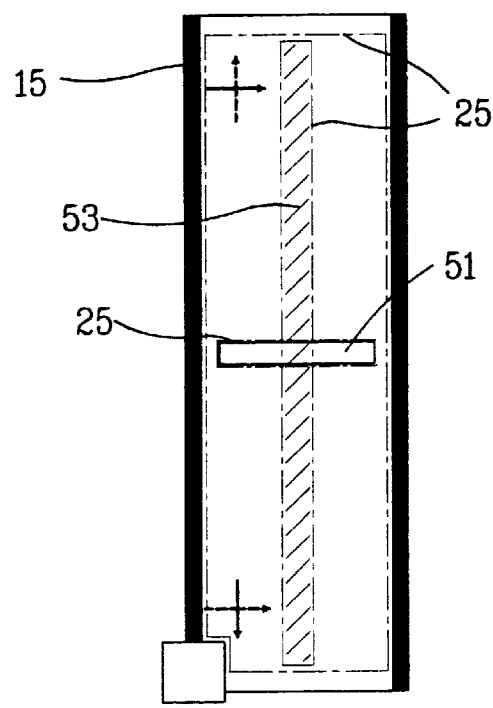
Figure 8C:
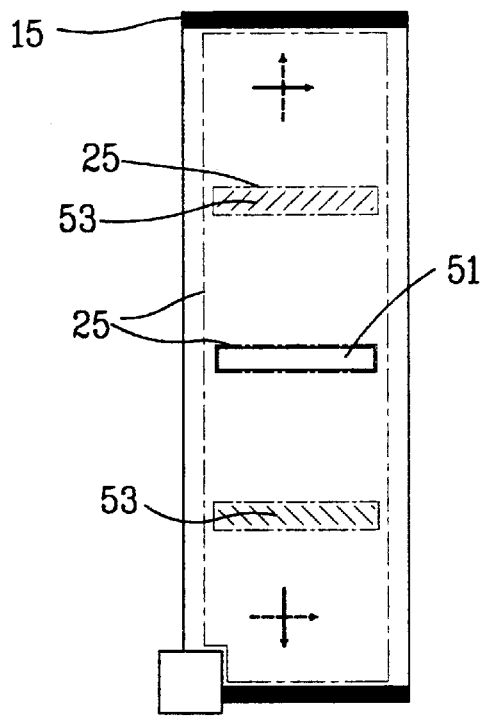
Figure 8D:
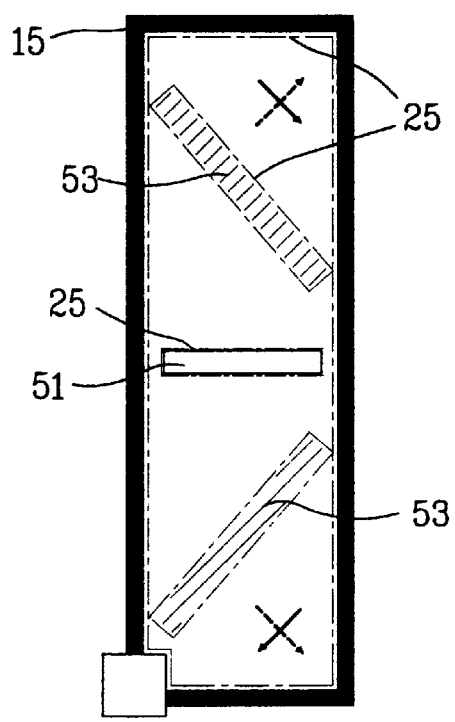
Figure 8E:
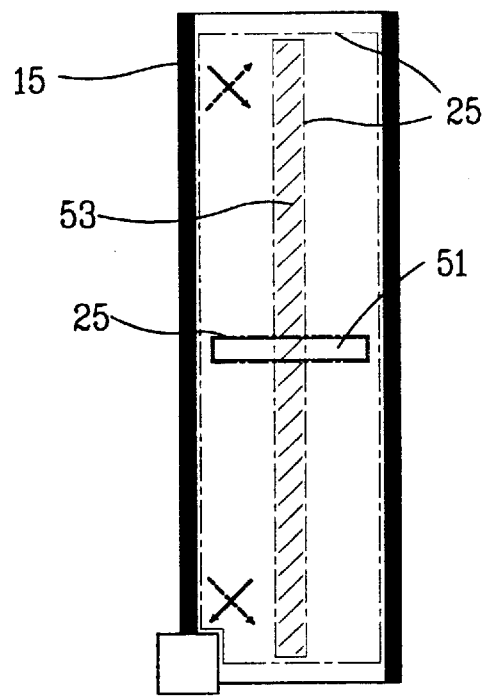
Figure 8F:
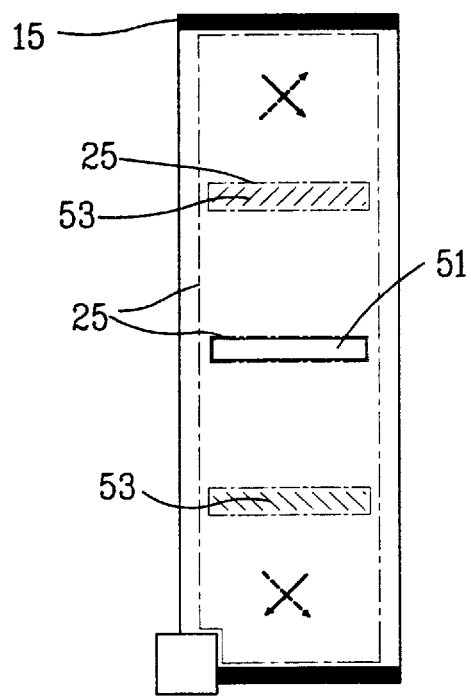
Figure 9A:
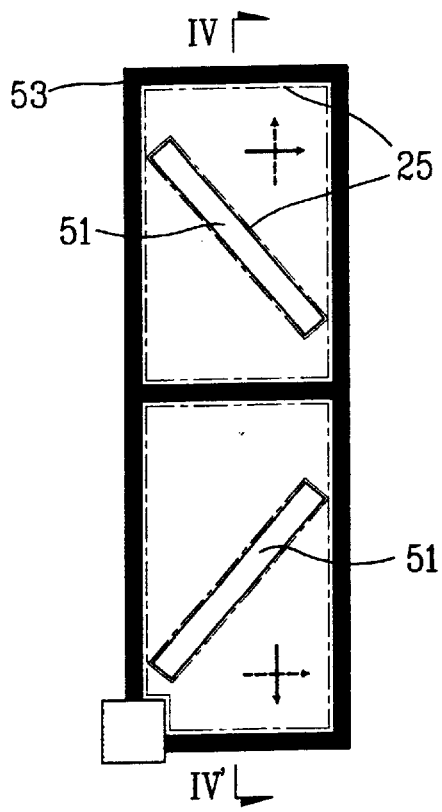
FIGS. 9A to 9F are plan views showing a multi-domain liquid crystal display device according to the fourth embodiment of the present invention.
Figure 9B:
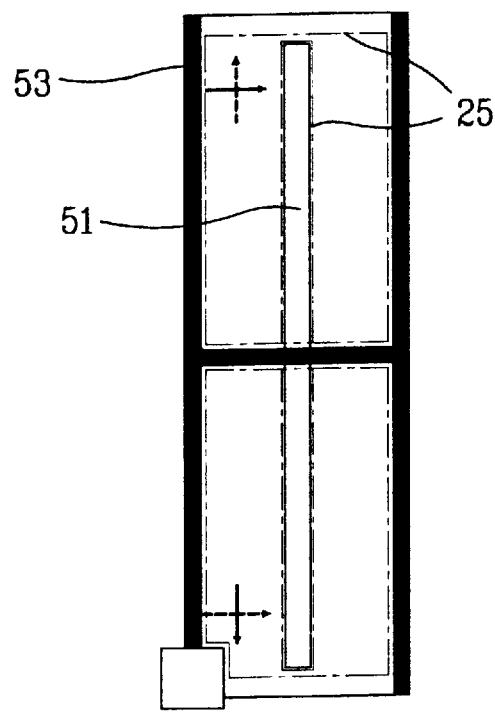
Figure 9C:
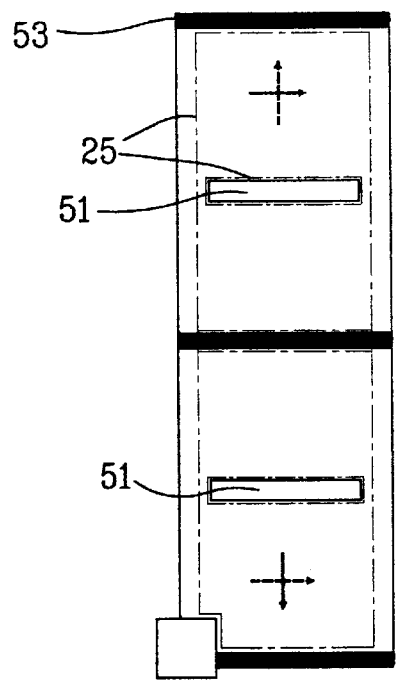
Figure 9D:
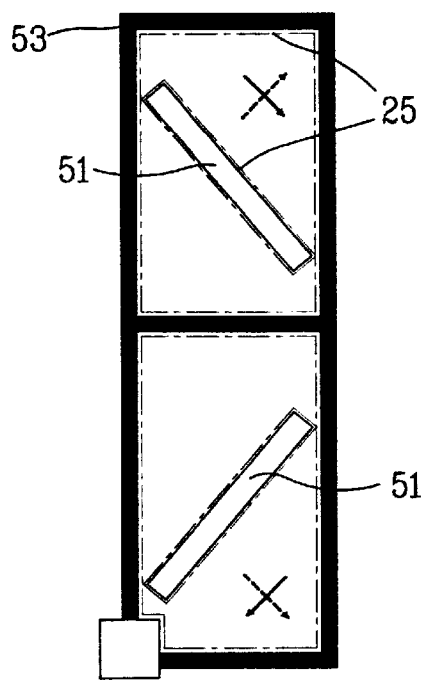
Figure 9E:
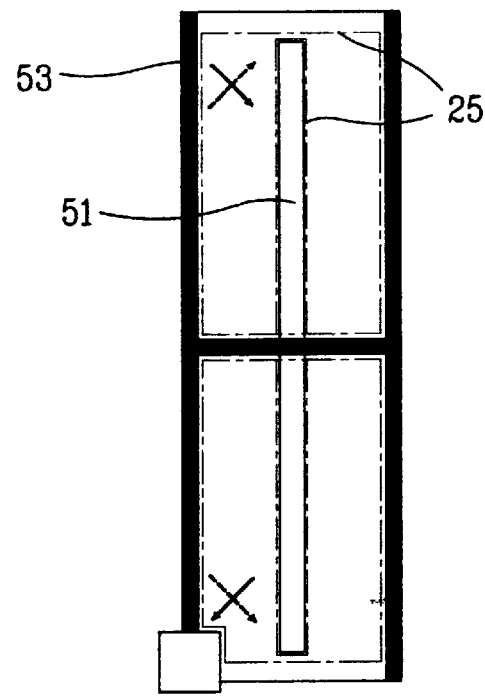
Figure 9F:
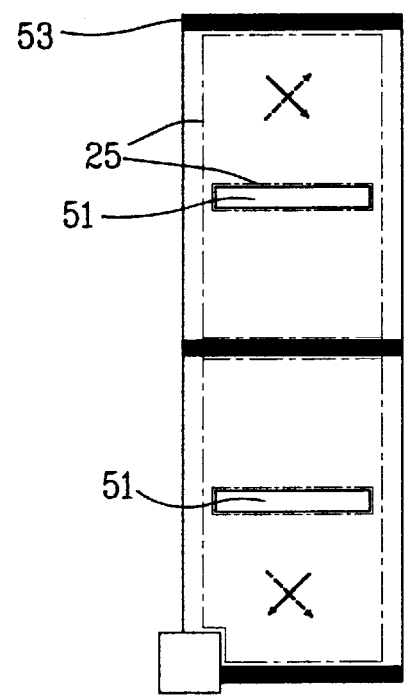

In the multi-domain liquid crystal display device of another embodiment of the present invention, shown in FIGS. 5 and 9, the electric field induction windows 51 are formed within the pixel electrode 13 in various shapes; the dielectric structures 53 are formed on the common electrode 17; and the light-shielding layer 25 is formed in a region where the electric field induction windows 51 and the dielectric structures 53 are formed on the first substrate 31 or the second substrate 33. The dielectric structures 53 are formed within and around the pixel region. Alternatively, the dielectric structures 53 are formed only on the gate lines 1 or the data lines 3.

In the multi-domain liquid crystal display device of the present invention, the dielectric structures 53 are formed on the pixel electrode 13 and/or the common electrode 17. The pixel electrode 13, the passivation film 37, the gate insulating film 35, the color filter layer 35, an overcoat layer, and/or the common electrode 17 are patterned to form the electric field induction windows 51 such as a hole or slit therein. Thus, electric field distortion effect and multi-domain effect can be obtained.

Four-domain or multi-domain effect can be obtained by the electric field induction windows 51 or the dielectric structures 53. The electric field induction windows 51 or the dielectric structures 53 may be formed on the first substrate or the second substrate, or independently or together on both substrates.

Additionally, in the multi-domain liquid crystal display device of the present invention, an alignment film (not shown) is formed over the first substrate and/or the second substrate. At this time, polyamide or polyimide based compound, polyvinylalcohol (PVA), polyamic acid, or $SiO_2$ is used as an alignment material of the alignment film. In case where rubbing is used to determine alignment direction, a material suitable for the rubbing may be used as the alignment material of the alignment film.

Furthermore, a photo-alignment film of a material such as polyvinylcinnamate (PVCN), polysiloxanecinnamate (PSCN), or cellulosecinnamate (CelCN) based compound may be formed. The other materials suitable for photo-alignment may be used as the alignment film. Light is radiated on to the photo-alignment film at least one time to determine a pretilt angle and alignment direction or pretilt direction of the director of the liquid crystal molecule at the same time, thereby obtaining stable alignment of the liquid crystal. Ultraviolet light is suitable for photo-alignment. Non-polarized light, linear-polarized light, unpolarized light or partially polarized light may be used for the photo-alignment.

The rubbing method or the photo-alignment method is applicable to one of the first substrate and the second substrate or both substrates. Different alignment methods are applicable to both substrates. Although the alignment film has been formed, alignment process may not be performed.

Furthermore, the aforementioned alignment is performed to form the multi-domain liquid crystal display device divided into at least two regions. Thus, the liquid crystal molecules of the liquid crystal layer may be aligned differently in each region. In other words, each pixel maybe divided into four regions in+shape or X shape, or each pixel maybe divided in horizontally, vertically, or diagonally. Alignment process or alignment direction is varied depending on each region and each substrate, so that multi-domain effect can be realized. At least one region of the divided regions may be an unaligned region or all the divided regions may be an unaligned region.

As aforementioned, the multi-domain liquid crystal display device has the following advantages. It is possible to improve a viewing angle by forming the dielectric structures and/or the electric field induction windows around and/or within the pixel region. Also, since the light-shielding layer is formed in the boundary region of the divided domains, leakage of light is prevented from occurring, thereby improving contrast.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A multi-domain liquid crystal display device comprising:
   a plurality of gate lines and data lines on a first substrate;
   a pixel region defined by the gate lines and the data lines;
   a first light-shielding layer on a second substrate;
   a common electrode on the second substrate;
   at least one dielectric structure on the common electrode dividing the pixel region to have different alignment directions;
   a common auxiliary electrode within the pixel region on the first substrate;
   a second light-shielding layer formed in a region corresponding to the dielectric structures; and
   a liquid crystal layer between the first substrate and the second substrate.

2. The multi-domain liquid crystal display device of claim 1, wherein the dielectric structures act as a light-shielding layer.

3. The multi-domain liquid crystal display device of claim 2, wherein the dielectric structures include a resin.

4. The multi-domain liquid crystal display device of claim 1, wherein the second light-shielding layer includes Cr, $CrO_x$, and resin.

5. The multi-domain liquid crystal display device of claim 1, wherein the second light-shielding layer is formed on a layer equal to the common auxiliary electrode.

6. The multi-domain liquid crystal display device of claim 5, wherein the second light-shielding layer is electrically connected with the common electrode.

7. The multi-domain liquid crystal display device of claim 5, wherein the second light-shielding layer is formed independently from other electrodes.

8. The multi-domain liquid crystal display device of claim 1, wherein the second light-shielding layer is formed on a layer equal to the first light-shielding layer.

9. The multi-domain liquid crystal display device of claim 1, further comprising at least one electric field induction window on the first substrate to divide the pixel region.

10. The multi-domain liquid crystal display device of claim 9, further comprising a third light-shielding layer in a region corresponding to at least one electric field induction window.

11. The multi-domain liquid crystal display device of claim 10, wherein the third light-shielding shielding layer includes one of Cr, $CrO_x$, and resin.

12. The multi-domain liquid crystal display device of claim 10, wherein the third light-shielding layer is formed on a layer equal to the common auxiliary electrode.

13. The multi-domain liquid crystal display device of claim 12, wherein the third light-shielding layer is electrically connected with the common electrode.

14. The multi-domain liquid crystal display device of claim 12, wherein the third light-shielding layer is formed independently from other electrodes.

15. The multi-domain liquid crystal display device of claim 10, wherein the third light-shielding layer is formed on a layer equal to the first light-shielding layer.

16. The multi-domain liquid crystal display device of claim 1, further comprising an alignment film at least one of the first and second substrates.

17. A multi-domain liquid crystal display device comprising:

a plurality of gate lines and data lines on a first substrate;
a pixel region defined by the gate lines and the data lines;
a first light-shielding layer on a second substrate;
a common electrode on the second substrate;
at least one dielectric structure within the pixel region on the common electrode;
at least one electric field induction window on the first substrate dividing the pixel region to have different alignment directions;
a second light-shielding layer in a region corresponding to the electric field induction window; and
a liquid crystal layer between the first substrate and the second substrate.

18. The multi-domain liquid crystal display device of claim 17, wherein the second light-shielding layer includes one of Cr, $CrO_x$, and resin.

19. The multi-domain liquid crystal display device of claim 17, wherein the second light-shielding layer is formed on the first substrate.

20. The multi-domain liquid crystal display device of claim 19, wherein the second light-shielding layer is electrically connected with the common electrode.

21. The multi-domain liquid crystal display device of claim 19, wherein the second light-shielding layer is formed independently from other electrodes.

22. The multi-domain liquid crystal display device of claim 19, wherein the third light-shielding layer is formed independently from other electrodes.

23. The multi-domain liquid crystal display device of claim 17, wherein the second light-shielding layer is formed on a layer equal to the first light-shielding layer.

24. The multi-domain liquid crystal display device of claim 17, wherein the dielectric structures act as a light-shielding layer.

25. The multi-domain liquid crystal display device of claim 24, wherein the dielectric structures include a resin.

26. The multi-domain liquid crystal display device of claim 17, further comprising a third light-shielding layer in a region corresponding to the dielectric structures formed within the pixel region.

27. The multi-domain liquid crystal display device of claim 26, wherein the third light-shielding layer includes one of Cr, $CrO_x$, and resin.

28. The multi-domain liquid crystal display device of claim 26, wherein the third light-shielding layer is formed on the first substrate.

29. The multi-domain liquid crystal display device of claim 28, wherein the third light-shielding layer is electrically connected with the common electrode.

30. The multi-domain liquid crystal display device of claim 26, wherein the third light-shielding layer is formed on a layer equal to the first light-shielding layer.

31. The multi-domain liquid crystal display device of claim 17, further comprising an alignment film on at least one of the first and second substrates.

32. A multi-domain liquid crystal display device comprising:

a plurality of gate lines and data lines on a first substrate;
a pixel region defined by the gate lines and the data lines;
a first light-shielding layer on a second substrate;
a common electrode on the second substrate;
at least one dielectric structure on the common electrode dividing the pixel region to have different alignment directions;
a second light-shielding layer formed in a region corresponding to the dielectric structures; and
a common auxiliary electrode around the pixel region on the first substrate.

33. The multi-domain liquid crystal display device of claim 32, wherein the dielectric structures act as a light-shielding layer.

34. The multi-domain liquid crystal display device of claim 33, wherein the dielectric structures include a resin.

35. The multi-domain liquid crystal display device of claim 32, wherein the second light-shielding layer includes Cr, $CrO_x$, and resin.

36. The multi-domain liquid crystal display device of claim 32, wherein the second light-shielding layer is formed on a layer equal to the common auxiliary electrode.

37. The multi-domain liquid crystal display device of claim 36, wherein the second light-shielding layer is electrically connected with the common electrode.

38. The multi-domain liquid crystal display device of claim 36, wherein the second light-shielding layer is formed independently from other electrodes.

39. The multi-domain liquid crystal display device of claim 32, wherein the second light-shielding layer is formed on a layer equal to the first light-shielding layer.

40. The multi-domain liquid crystal display device of claim 32, further comprising at least one electric field induction window on the first substrate to divide the pixel region.

41. The multi-domain liquid crystal display device of claim 40, further comprising a third light-shielding layer in a region corresponding to at least one electric field induction window.

42. The multi-domain liquid crystal display device of claim 41, wherein the third light-shielding layer includes one of Cr, $CrO_x$, and resin.

43. The multi-domain liquid crystal display device of claim 41, wherein the third light-shielding layer is formed on a layer equal to the common auxiliary electrode.

44. The multi-domain liquid crystal display device of claim 43, wherein the third light-shielding layer is electrically connected with the common electrode.

45. The multi-domain liquid crystal display device of claim 43, wherein the third light-shielding layer is formed independently from other electrodes.

46. The multi-domain liquid crystal display device of claim 41, wherein the third light-shielding layer is formed on a layer equal to the first light-shielding layer.

47. The multi-domain liquid crystal display device of claim 32, further comprising an alignment film on at least one of the first and second substrates.

48. A multi-domain liquid crystal display device comprising:
- a plurality of gate lines and data lines on a first substrate;
- a pixel region defined by the gate lines and the data lines;
- a first light-shielding layer on a second substrate;
- a common electrode on the second substrate;
- at least one dielectric structure around the pixel region on the common electrode;
- at least one electric field induction window on the first substrate dividing the pixel region to have different alignment directions;
- a second light-shielding layer in a region corresponding to the electric field induction window; and
- a liquid crystal layer between the first substrate and the second substrate.

49. The multi-domain liquid crystal display device of claim 48, wherein the second light-shielding layer includes one of Cr, $CrO_x$, and resin.

50. The multi-domain liquid crystal display device of claim 48, wherein the second light-shielding layer is formed on the first substrate.

51. The multi-domain liquid crystal display device of claim 50, wherein the second light-shielding layer is electrically connected with the common electrode.

52. The multi-domain liquid crystal display device of claim 50, wherein the second light-shielding layer is formed independently from other electrodes.

53. The multi-domain liquid crystal display device of claim 50, wherein the third light-shielding layer is formed independently from other electrodes.

54. The multi-domain liquid crystal display device of claim 48, wherein the second light-shielding layer is formed on a layer equal to the first light-shielding layer.

55. The multi-domain liquid crystal display device of claim 48, wherein the dielectric structures act as a light-shielding layer.

56. The multi-domain liquid crystal display device of claim 55, wherein the dielectric structures include a resin.

57. The multi-domain liquid crystal display device of claim 48, further comprising a third light-shielding layer in a region corresponding to the dielectric structures formed within the pixel region.

58. The multi-domain liquid crystal display device of claim 57, wherein the third light-shielding layer includes one of Cr, $CrO_x$, and resin.

59. The multi-domain liquid crystal display device of claim 57, wherein the third light-shielding layer is formed on the first substrate.

60. The multi-domain liquid crystal display device of claim 59, wherein the third light-shielding layer is electrically connected with the common electrode.

61. The multi-domain liquid crystal display device of claim 57, wherein the third light-shielding layer is formed on a layer equal to the first light-shielding layer.

62. The multi-domain liquid crystal display device of claim 48, further comprising an alignment film on at least one of the first and second substrates.

63. A multi-domain liquid crystal display device comprising:
- a plurality of gate lines and data lines on a first substrate;
- a pixel region defined by the gate lines and the data lines;
- a first light-shielding layer on a second substrate;
- a common electrode on the second substrate;
- at least one dielectric structure on the common electrode dividing the pixel region to have different alignment directions;
- a common auxiliary electrode adjacent the pixel region on the first substrate;
- a second light-shielding layer formed in a region corresponding to the dielectric structures; and
- a liquid crystal layer between the first substrate and the second substrate.

64. A multi-domain liquid crystal display device comprising:
- a plurality of gate lines and data lines on a first substrate;
- a pixel region defined by the gate lines and the data lines;
- a first light-shielding layer on a second substrate;
- a common electrode on the second substrate;
- at least one dielectric structure adjacent the pixel region on the common electrode;
- at least one electric field induction window on the first substrate dividing the pixel region to have different alignment directions;
- a second light-shielding layer in a region corresponding to the electric field induction window; and
- a liquid crystal layer between the first substrate and the second substrate.

* * * * *